United States Patent [19]

Moyer

[11] Patent Number: 5,737,584
[45] Date of Patent: Apr. 7, 1998

US005737584A

[54] DATA PROCESSING SYSTEM HAVING PROGRAMMABLE EXTERNAL TERMINALS SUCH THAT THE EXTERNAL TERMINALS ARE SELECTIVELY SUBJECTED TO BUS ARBITRATION

[75] Inventor: William C. Moyer, Dripping Springs, Tex.

[73] Assignee: Motorola, Inc., Schaumburg, Ill.

[21] Appl. No.: 589,699

[22] Filed: Jan. 22, 1996

[51] Int. Cl.⁶ .................................................. G06F 13/364
[52] U.S. Cl. .......................... 395/500; 395/287; 395/293; 711/106
[58] Field of Search ........................... 395/500, 285, 395/287, 288, 299, 595, 741, 309, 289, 290, 291, 293, 728; 711/106, 163

[56] References Cited

U.S. PATENT DOCUMENTS

| | | | |
|---|---|---|---|
| 4,257,095 | 3/1981 | Nadir | 395/299 |
| 4,495,569 | 1/1985 | Kagawa | 395/741 |
| 4,760,521 | 7/1988 | Rehwald et al. | 711/106 |
| 5,097,437 | 3/1992 | Larson | 395/595 |
| 5,191,657 | 3/1993 | Ludwig et al. | 395/285 |
| 5,287,464 | 2/1994 | Kumar et al. | 395/309 |
| 5,353,416 | 10/1994 | Olson | 395/288 |
| 5,388,232 | 2/1995 | Sullivan et al. | 395/285 |
| 5,432,950 | 7/1995 | Sibigotroth | 711/163 |
| 5,457,802 | 10/1995 | Catherwood et al. | 395/287 |

OTHER PUBLICATIONS

Intel ;APX 86/88, 186/188 User's Manual, 1985.

*Primary Examiner*—Kevin J. Teska
*Assistant Examiner*—Tyrone V. Walker
*Attorney, Agent, or Firm*—Keith E. Witek

[57] ABSTRACT

One or more of control bits (FIG. 7) are formed within a data processor (12) wherein the one or more control bits (FIG. 7) are programmable by the CPU (150) of the data processor (12). When the CPU (150) programs the one or more control bits (FIG. 7) to a first logic state, the one or more chip select control signals which are routed external to the data processor (12) are arbitrated with the external bus. Therefore, the processor (12) must have ownership of the external bus in order to drive the chip selects when operating in this mode of operation. When the CPU (150) programs the one or more control bits (FIG. 7) to a second logic state, the one or more chip select control signals which are routed external to the data processor (12) operate independently of the bus ownership. This ability to select between two modes of operation provides greater flexibility in board level configuration and design.

24 Claims, 5 Drawing Sheets

FIG.7

| 31-15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| R 0 | AC | WSC | | | DA | | | EBC | DSZ | | | WP | PF | PA | CSEN |
| W | | | | | | | | | | | | | | | |
| RESET | | | | | | | | | | | | | 0 | 0 | 0 |

300

| 31-15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| R 0 | AC | WSC | | | DA | | | EBC | DSZ | | | WP | PF | PA | CSEN |
| W | | | | | | | | | | | | | | | |
| RESET | | | | | | | | | | | | | | | 0 |

400

DATA PROCESSING SYSTEM HAVING PROGRAMMABLE EXTERNAL TERMINALS SUCH THAT THE EXTERNAL TERMINALS ARE SELECTIVELY SUBJECTED TO BUS ARBITRATION

FIELD OF THE INVENTION

The present invention relates generally to data processing systems, and more particularly, to allowing external pins of an integrated circuit to be programmed so that the external pins may be used subject to bus arbitration or used independent of bus arbitration.

BACKGROUND OF THE INVENTION

In most cases, microprocessors are incorporated into an electronic or electrical system that contains many integrated circuits and/or discrete electronic elements. For example, a data processor may be formed in a multiprocessor environment that contains two or more processors that communicate to each other. In another form, data processors may be coupled in a system that contains peripherals or subsystems wherein the peripherals or subsystems perform other electronic operations such as memory storage, signal conversion, timer operations, and the like. In order to communicate with peripherals, a bus structure is typically used wherein the bus structure contains control signals, address signals, and data signals. In addition to these bus signals, other output control signals are usually required in a data processing system.

In a first embodiment, these control outputs are arbitrated along with the ownership of the bus so that these control signals can only be used when the address signals, data signals, and bus control signals are granted to a data processor. This mode of operation can be disadvantageous in some electrical designs since the use of the output control signals are contingent upon ownership of the bus. Therefore, in order to use the output control signals, the bus needs to be granted to the data processor even though the bus need not be utilized by the data processor. Therefore, if a first processor needs access to a bus in order to perform bus operations and a second processor needs access to the control signals to provide control operations, the two processors cannot perform these two operations simultaneously and instead the bus operations required by the first processor and the control operations required by the second processor must be performed in a time sequential manner. Therefore, this requirement of time sequential operation and arbitration of control signals via a bus grant signal has inherent performance degradation effects.

In a second form, the output control signals may be designed in the data processor such that the output control signals operate independently of ownership of the bus. However, when this design is selected, two data processors in a single electronic system may attempt to use the same output control signals at the same time. This conflict must be resolved by glue logic external to the data processors. The inclusion of this glue logic on a circuit board or a design will increase the surface area of the circuit board, wherein increased surface area is not only detrimental to the physical size of the electrical circuit, but to the power performance of the circuit as well. Therefore, this option of providing free access to the control signals independent of bus operation may be unfeasible for electrical designs that require low power or for products, such as hand-held devices, wherein small surface areas and small volumes are a necessity.

A processor in the prior art is either programmed to operate in the first form or second form above and are "hard-wired" into these modes of operation so that the mode cannot be changed. Therefore, the designers are stuck with the inherent disadvantages of one of these modes of operation.

In other words, electrical system designers were required to either: (1) choose an integrated circuit designed to operate output control signals based upon bus arbitration; or (2) choose for their design a microprocessor which did not arbitrate output control signals with bus ownership. The result of this choice what that electric circuit designers were limited to a microprocessor that had either control signals arbitrated with the bus or control signals that were not arbitrated with the bus. Therefore, system designers who wanted to have increased performance chose a processor that allowed for output control operation independent of the bus while designers requiring low power or a small foot print chose integrated circuit products that had output control arbitrated with bus ownership. These two ICs were not the same product and in many cases forced a system designer to choose a different IC for low power products and yet another IC for high performance products within the same family of products. This clearly results in family compatibility problems and design complexity.

It would be highly advantageous to have a processor which allowed for dynamic configuration of either operating control signals based upon bus operation or operating control signals independent of bus ownership to correct some of the deficiencies presented above.

BRIEF DESCRIPTION OF THE DRAWINGS

FIG. 7 illustrates, in a block diagram, the control registers utilized in FIG. 6 in accordance with the present invention.

DESCRIPTION OF A PREFERRED EMBODIMENT

Figure 1:
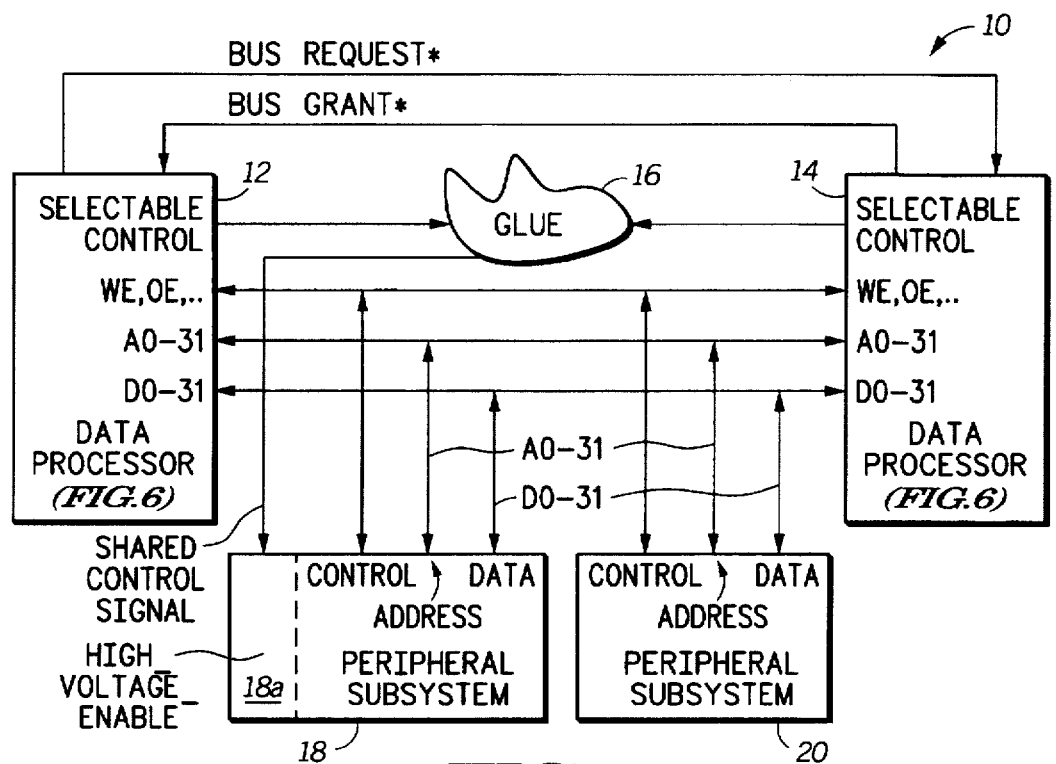
FIG. 1 illustrates, in a block diagram, a two processor system coupled to a floating gate peripheral device in accordance with the present invention.
Figure 2:
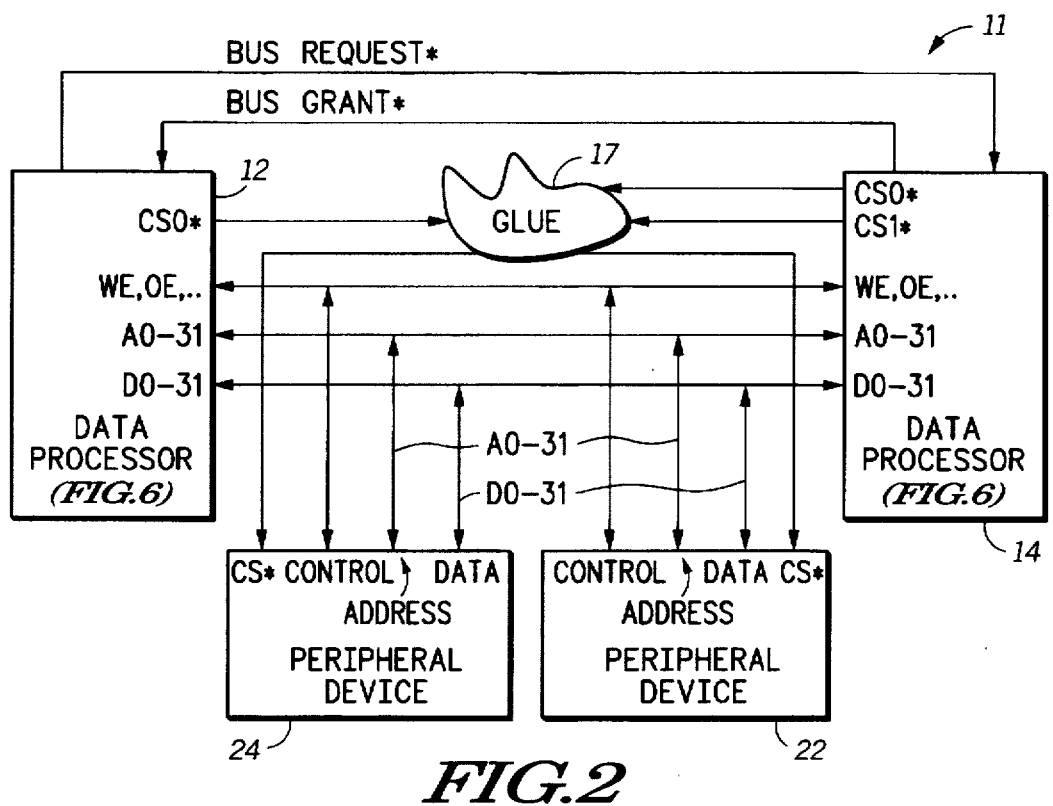
FIG. 2 illustrates, in a block diagram, a two processor system having chip selects in accordance with the present invention.

Generally, the present invention includes a microprocessor and a data processing system including the microprocessor integrated circuit (IC) wherein the microprocessor has programmable output control terminals. These programmable output control terminals are programmed into one of two operational modes via control bits internal to the microcontroller or microprocessor. The programmable control bits are set by a user of the microprocessor by executing a move, set, or write instruction. These programmable bits indicate in a first state that one or more control output terminals are to be arbitrated with the bus so that the systems of FIG. 3 and FIG. 4 can be created selectively. When the programmable bits are set to a second state, the microprocessor is programmed such that the output control terminals are not arbitrated with the bus and require glue logic as indicated in FIG. 1 and FIG. 2 herein. The advantage of this programmable option in a microprocessor is that a single product or microprocessor can be purchased and used for both high performance systems, as illustrated in FIG. 1 and FIG. 2, or for small area low power application illustrated in FIGS. 3 and 4. In addition, the control bits may be individually set or reset such that each individual IC output control terminal may be independently selectable as either arbitrated with the bus or as operational independent of a bus grant signal. Also, these bits can be changed dynamically by the system at any time so that the system can dynamically be changed between the two modes of operation as need be.

This invention can be further understood with reference to FIGS. 1–7.

FIG. 1 illustrates an electrical system 10. Electrical system 10 has a first microprocessor or microcontroller 12 and a second microprocessor or microcontroller 14. These devices are referred to as data processor 12 and data processor 14 in FIG. 1 and are illustrated in more detail in FIG. 6. The data processors output and/or receive bus control information in the form of write enable (WE), output enable (OE), and like control signals as illustrated in FIG. 1. A 32-bit address bus labeled as A0–A31 is illustrated in FIG. 1. A data bus labeled as D0–D31, which contains 32-bit lines, is illustrated in FIG. 1. Other bus sizes may be used. The control bus containing the signals WE, OE, and the like, and the address bus and the data bus, are coupled to peripheral subsystems 18 and 20, so that information can be communicated to and from the peripheral subsystems and one or more of the microprocessors 12 and 14 in FIG. 1. The control bus containing signals WE, OE, etc., and the address bus and data bus are granted to the microprocessor for use via a process known as "granting ownership of the bus" or "bus arbitration." This granting of ownership is performed via two control signals illustrated in FIG. 1 as the bus grant signal and the bus request signal. In FIG. 1, the bus grant signal and the bus request signal are both indicated to be active low, however, these signals may be made active high in another embodiment.

Since only two data processors are illustrated in FIG. 1, an external bus arbiter is not required for operating a two processor system. Instead, data processor 14 controls the bus by default whenever data processor 12 does not need the bus. Therefore, since data processor 14 always has the bus by a default condition, processor 14 may always perform operations on the bus as long as data processor 12 is not using the bus. When the data processor 12 needs to use the address or data buses, data processor 12 sends a bus request signal to data processor 14. Data processor 14 then either immediately or at its leisure grants the bus to data processor 12 via a bus grant signal and relinquishes its control over the address line and data lines. To avoid bus contention, processors that do not own the bus are tri-stated or electrically decoupled from the bus which includes the address, data, and WE, OE, etc. lines. Care must be taken either in software or via a scheduling scheme, such as a time out or a round robin approach, so that the data processor 12 does not entirely dominate the address bus and data bus and starve data processor 14 due to no access to the bus and vice versa.

FIG. 1 illustrates general purpose outputs that are labeled as selectable control. These lines can be control signals used for any purpose or be special purpose data lines. Only one selectable control is illustrated in FIG. 1. However, data processors 12 and 14 (see FIG. 6) provide for several selectable control signals as outputs from the data processors 12 and 14. Only one such signal is utilized and illustrated in FIG. 1 for the sake of clarity and ease of illustration. The selectable control signals from the data processors 12 and 14 are connected into glue logic 16 as illustrated in FIG. 1. The glue logic of FIG. 1 performs an arbitration function wherein only one of the selectable control signals output from the data processors 12 and 14 are allowed to control the shared control signal input into the high voltage enable circuitry of peripheral subsystem 18 at any one time. The glue logic 16 may be designed so that one selectable control signal for example the selectable control signal from data processor 14, always has priority over the selectable control signal of data processor 12. However, other complex priority schemes such as a toggling scheme or first to assert scheme may be used in FIG. 1. The glue logic 16 also ensures that when neither selectable control signal is being asserted or deasserted that the high voltage enable is stable at a steady logic value or steady voltage so that the peripheral subsystem 18 can properly operate.

FIG. 1 specifically illustrates that the shared control signal controls a high voltage enable portion 18a of peripheral subsystem 18. Therefore, FIG. 1 teaches that the peripheral subsystem 18 is a floating gate device such as an EPROM, a EEPROM, a flash memory, a non-volatile memory, or the like. The shared control signal enables the high voltage circuitry 18a so that the floating gate peripheral subsystem 18 can be reset or erased. It is important to note that the selectable control signals in FIG. 1 may be used for any purpose to control any external peripheral in the system 10. In FIG. 1, the glue logic 16 is needed since the selectable control signals of data processors 12 and 14 are set to a mode which requires external arbitration independent of the bus ownership. This mode of operation of the selectable control signals is determined by the programming of control bits within the data processors themselves.

FIG. 2 illustrates an electrical system 11. Electrical system 11 contains the two microprocessors 12 and 14 wherein each microprocessor contains programmable control bits that allow for the chip select signals CS0 and CS1 to be programmed as either arbitrated via bus arbitration or as operational independent of bus arbitration. In FIG. 2, the chip select signals have been programmed by these control bits such that the operation of these chip selects is independent of the bus grant signal. In other words, CS0 and CS1 operate in a manner which is independent of bus arbitration. FIG. 2 illustrates that the address bus and data bus from the data processors 12 and 14 are coupled to peripheral devices 24 and 22. These devices can be memory devices or any other external peripheral device. Glue logic 17 receives as input the chip select CS0 from data processor 12 and the chip selects CS1 and CS0 from data processor 14. These chip select signals CS1 and CS0 are illustrated in FIG. 2 as being active low but may be made active high in another embodiment.

The glue logic is used to arbitrate whether the CS0 signal from data processor 12 or the CS0 signal from data processor 14 are passed along to the peripheral device 24 in the event of any conflict between these two CS0 signals. In addition, the glue logic 17 passes through chip select CS1 to peripheral device 22, or holds the chip select CS1 that is input to peripheral device 22 to a stable and operational logic value if chip select CS1 from the processor 14 is either tristated or not active. Therefore, FIG. 2 is similar to FIG. 1 with the exception that chip selects are illustrated as control signals and the glue logic is illustrated as performing priority control, logic value hold functions, and the handling of a plurality of control signals.

FIGS. 1 and 2 illustrate that the selectable control outputs or chip selects from the data processors 12 and 14 can be functionally used without having to wait for a bus ownership to be granted to one or more data processors. Therefore, even though surface area of the board-level system increases and power consumption may be increased, the performance of the systems in FIGS. 1 and 2 is improved since granting of the bus is not required before data processors can access external peripherals via the selectable control signals.

Figure 3:
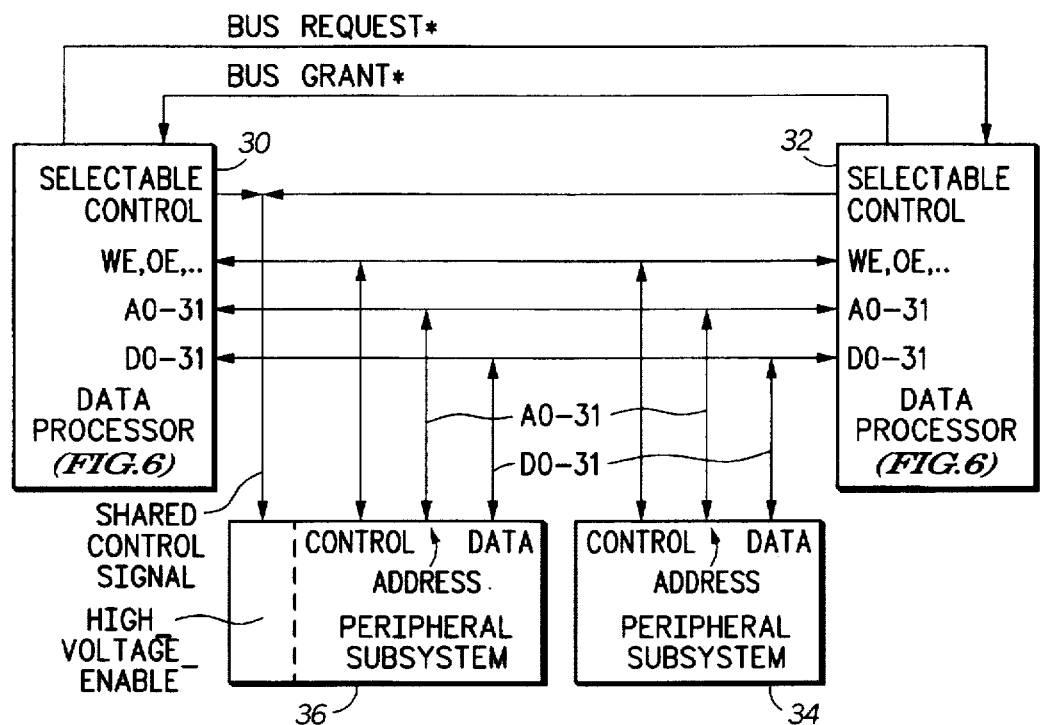
FIG. 3 illustrates, in a block diagram, another two processor system coupled to a floating gate peripheral device in accordance with the present invention.

FIG. 3 illustrates a system similar to that of FIG. 1. The difference between FIG. 3 and FIG. 1 is that the selectable control signals have been programmed via bits internal to the data processors 30 and 32 such that the selectable control signals are only functional contingent upon when the bus is granted. Therefore, the selectable control signals of data processor 30 are only functional when the bus grant is asserted to data processor 30. Therefore, any data processor that cannot use the WE, OE, address lines, and data lines, cannot use the selectable control signals. Given this mode of operation, external logic is significantly reduced and a circuit board surface area and a power consumption of the electrical system of FIG. 3 is reduced when compared to that of FIG. 1. Therefore, the system of FIG. 3, even though suffering a slight performance penalty, is preferred over the system of FIG. 1 when a small circuit board size and a low power application is required. Therefore, the subsystem of FIG. 3 is likely to be used for small hand-held products or portable products which require lower power. The subsystems 36 and 34 in FIG. 3 are similar to the subsystems 18 and 20 in FIG. 1.

Figure 4:
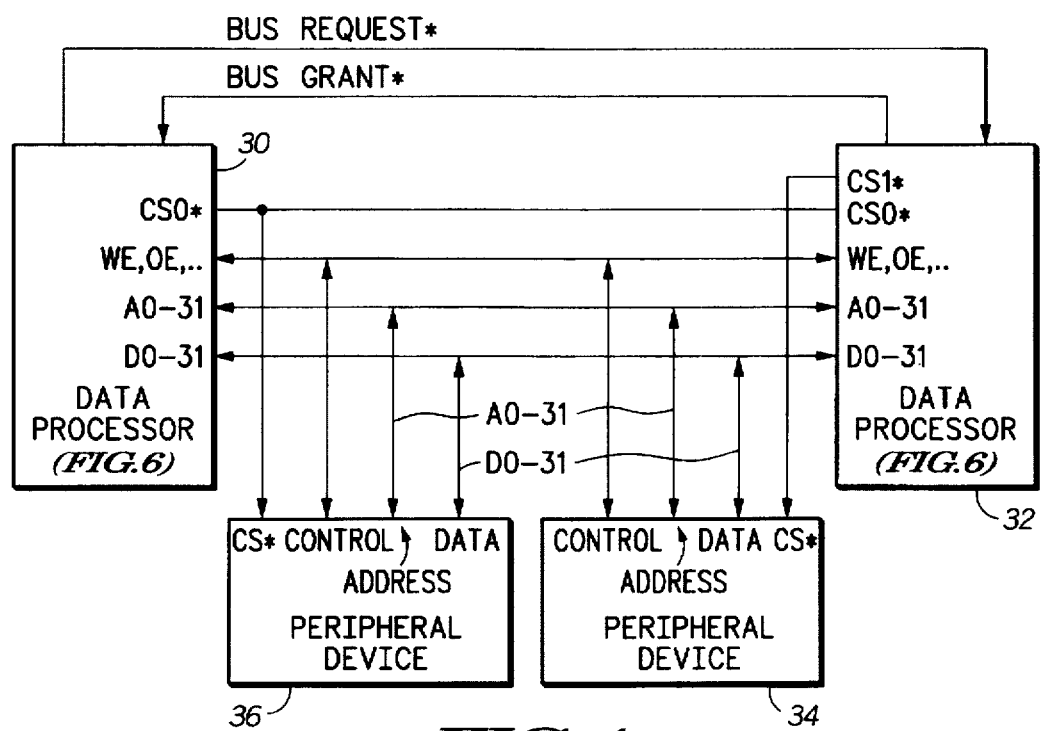
FIG. 4 illustrates, in a block diagram, another two processor system having chip selects in accordance with the present invention.

FIG. 4 illustrates a data processing system similar to that of FIG. 2. The difference between FIG. 4 and FIG. 2 is that FIG. 4 has been programmed via programmed bits within the data processors 30 and 32 so that the chip select signals CS0 and CS1 are functional only when the bus is granted to their respective data processors. Once again, the external logic of these systems is significantly reduced, thereby allowing for the formation of smaller circuit boards containing products that consume less power. Therefore, FIGS. 1–4 illustrate the various programmable modes of operation and the advantages of having a data processor which has control outputs that are programmed to either operate in a state which requires bus arbitration in order to function or a mode of operation which does not require a bus arbitration.

Figure 5:
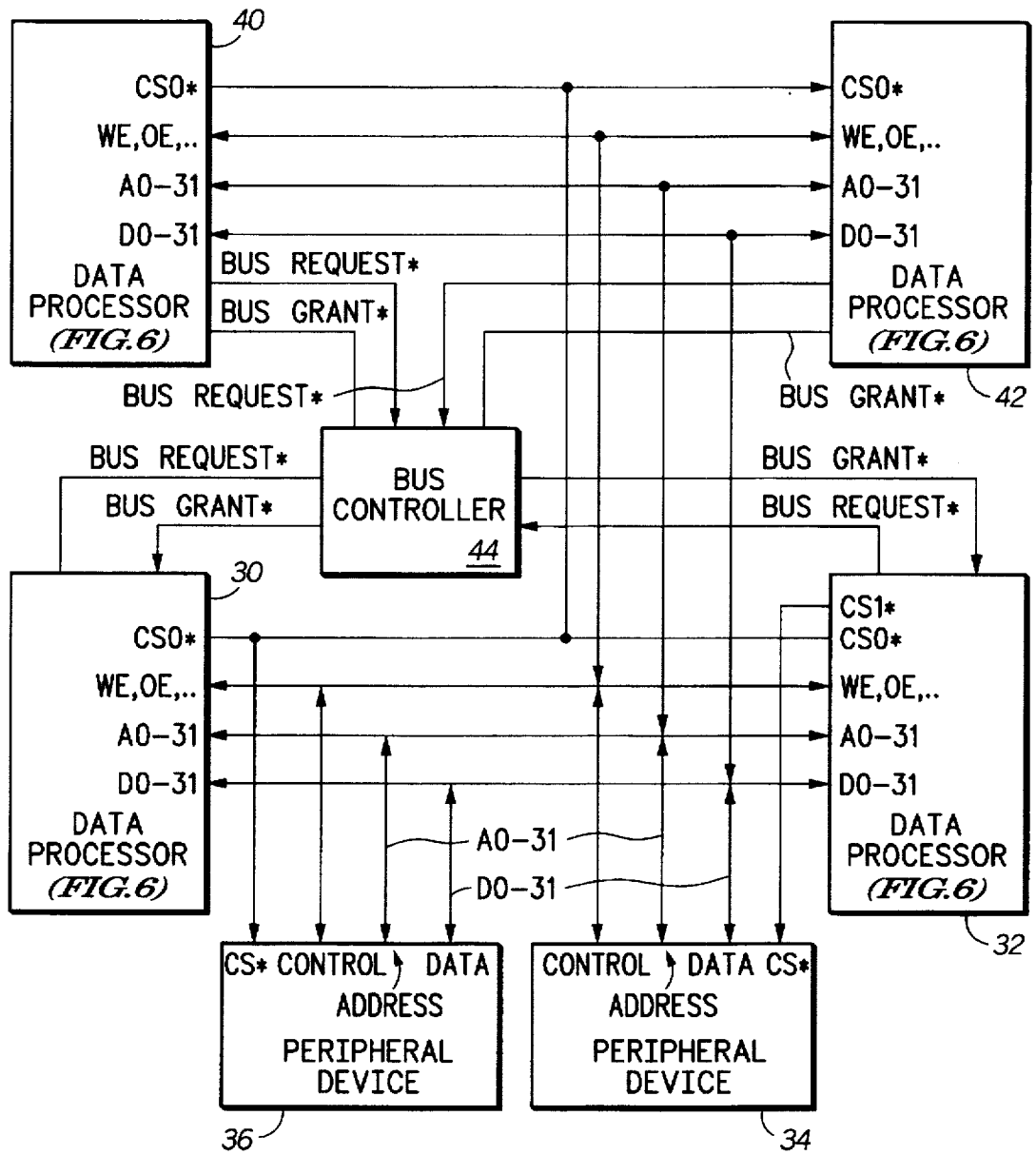
FIG. 5 illustrates, in a block diagram, a multi-processor system having chip selects in accordance with the present invention.

FIG. 5 illustrates a data processing system that has more than two processors and is therefore different from that illustrated in FIGS. 1–4. FIG. 5 illustrates the data processors 30 and 32 along with the same peripheral devices 36 and 34. However, FIG. 5 also illustrates two additional data processors 40 and 42. Since there are more than two processors in the system, an external bus controller or bus arbiter 44 is needed to determine priority between multiple bus requests and to grant the bus via the bus grant signal to only one data processor at a time. In one form, the arbiter 44 may be a circuit internal to one of the processor 30, 32, 40, and/or 42. Each of the data processors contain programmable bits so that the chip select signal CS0 and CS1 do not require external arbitration when these programmable bits are set to a programmed state. Therefore, the external arbitration logic is simplified since external arbitration is not required for the chip select control signals or like programmable general purpose output signals, since these signals are programmed to be functional only when the bus grant is granted to the product.

Therefore, FIG. 5 is analogous to FIG. 4 with the major difference being that FIG. 5 contains many more microprocessors within an electrical system. It is clear to see that in a two processor system the savings of circuitry is such that no external circuitry is required for arbitration. However, FIG. 5 illustrates that as more microprocessors are added to the system, external arbitration may very well be required, but the external arbitration of the programmable control signals can be minimized or eliminated via the programmable means internal to the data processors.

Figure 6:
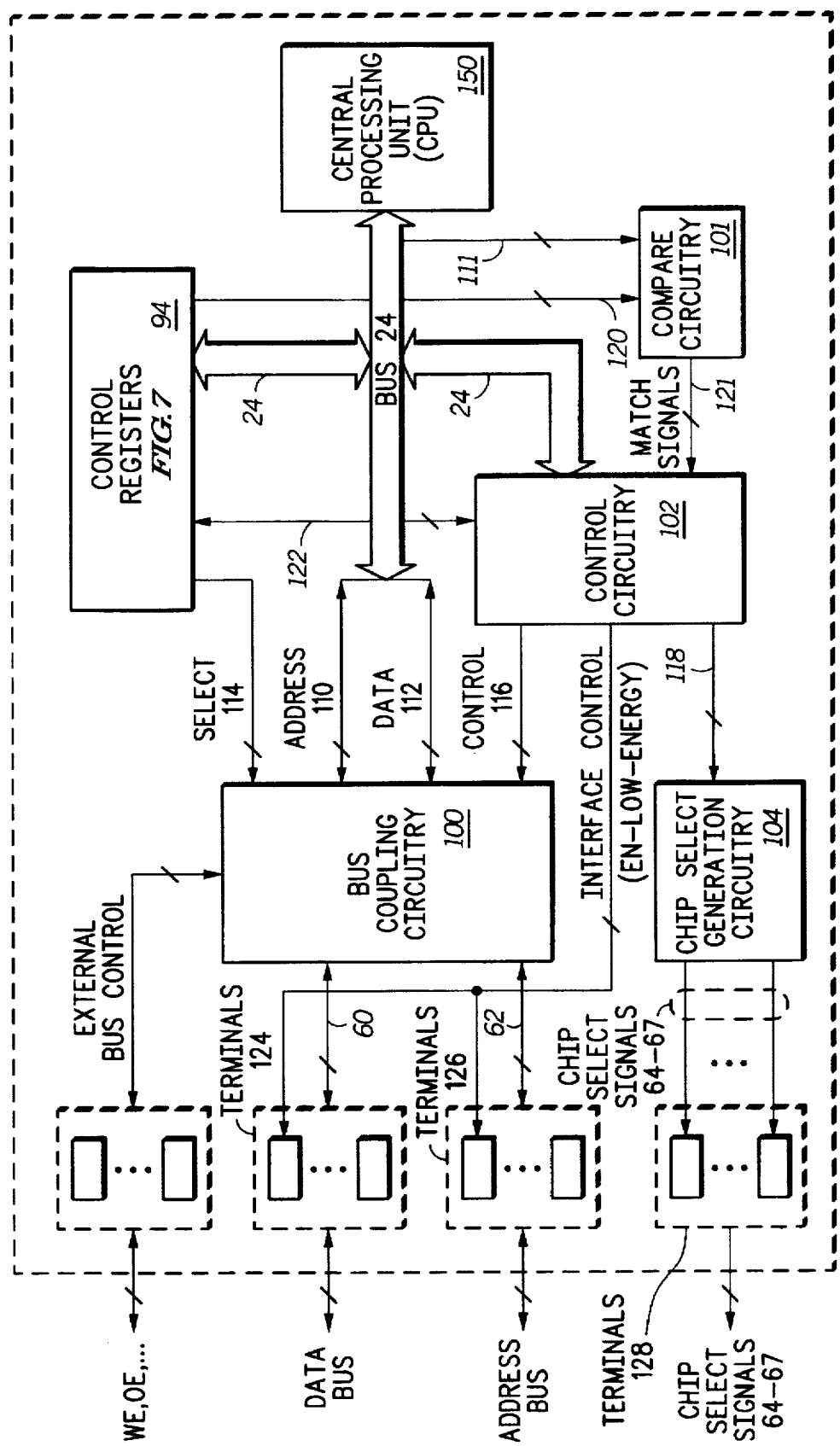
FIG. 6 illustrates, in a block diagram, a data processor integrated circuit (IC) which can be used for the data processors in FIGS. 1–5 in accordance with the present invention.

FIG. 6 illustrates a pertinent portion of data processors 12 and 14 of FIG. 1 in accordance with one embodiment of the present invention. FIG. 6 includes control registers 94 (which contain the programmable bits used to obtain the modes taught in FIGS. 1–5), bus coupling circuit 100, compare circuitry 101, control circuitry 102, chip select generation circuitry 104, external terminals and output/input buffers 124, external terminals and output/input buffers 125, external terminals and output/input buffers 126, and external terminals and output buffers 128. Bus 24 bi-directionally transfers address, data, and control information to each of control registers 94, control circuitry 102, CPU 150, and bus coupling circuitry 100. Address bus 110 is a portion of bus 24 which provides address bits [0–31] to bus coupling circuitry 100. Data bus 112 is a portion of bus 24 which provides data bits [0–31] to bus coupling circuitry 100. Control bus 116 is a portion of bus 24 which provides control information between bus coupling circuitry 100 to control circuitry 102. Note that in some embodiments of the present invention, control circuitry 102 may provide external bus cycle control signals (e.g. address strobe, data strobe, write enable, column address strobe, row address strobe, read/write, etc.) external to data processor 12 by way of one or more terminals (not illustrated in FIG. 6).

Bus 24 is coupled to control registers 94 such that CPU 150 within the processor 12 may perform read and write accesses to control registers 94. Bus 24 is coupled to control circuitry 102 in order to provide and receive control information. Bus 24 is coupled to bus coupling circuit 100 by way of address bus 110 and data bus 112 in order to communicate address bits [0–31] and data bits [0–31] within an electrical data processing system. Bus 24 is coupled to compare circuitry 101 via a signal 111 to provide at least a portion of address bits [0–31].

Registers 94 include a plurality of peripheral control registers 95 (in FIG. 7) and a chip select control register (not shown herein). The chip select control register includes bus loading control bits, address range bits, and other chip select control bits. Bus loading control bits are provided to bus coupling circuit 100 by conductors 114. Compare circuitry 101 is coupled to the chip select control register to receive the address range bits, and possibly one or more of the other chip select control bits. Compare circuitry 101 provides compare result signals (match signals) to control circuitry 102 via a plurality of conductors 121. Control circuitry 102 provides control signals to bus coupling circuit 100 by a plurality of conductors 116, and control circuitry 102 provides control signals to chip select generation circuitry 104 via a plurality of conductors 118. Control circuitry 102 also provides an Output Enable signal and a Write Enable signal (illustrated also in FIGS. 1–5 and used to control external bus operations). Control circuitry 102 is bi-directionally coupled to control registers 94. In one embodiment of the present invention, control circuitry 102 receives control bits from the chip select control bits stored in control registers 94 and provides status information back to other chip select control bits. Note that in alternate embodiments of the present invention, the functionality of control circuitry 102 and bus coupling circuit 100 may be combined into one circuit.

Bus coupling circuit 100 is bi-directionally coupled to terminals 124 via a bus 60. Bus coupling circuit 100 is bi-directionally coupled to terminals 126 via a bus 62. Chip select generation circuitry 104 is bi-directionally coupled to terminals 128 via a plurality of chip select conductors 64–67. Terminals 125 are coupled to the bus control circuitry (or alternatively to the circuitry 102) to provide control signals (WE, OE, . . .) for the external address and data bus. The plurality of terminals 124 are used to provide a data bus (see FIGS. 1–5) external to data processor 12. The plurality of terminals 126 are used to provide an address bus external to data processor 12. The plurality of terminals 128 are used to provide chip select signals 64–67 external to data processor 12. It is important to note that any number of chip selects or programmable general purpose outputs (as illustrated by the high-voltage signal of FIG. 1 and FIG. 3) may be provided for within the processor 12.

Integrated circuit terminals 124, 126, and 128 may be any type of apparatus which allows electrical signals to be transferred to or from data processor 10. For example, integrated circuit terminals 124, 126, and 128 may be integrated circuit terminals, solder bumps, or wire conductors, including any type of output, input, or I/O driving buffers as needed.

Referring now to FIG. 7, FIG. 7 illustrates the control registers 94 of FIG. 6 in accordance with one embodiment of the present invention. In one embodiment of the present invention, each programmable output control signal (labeled as chip selects in FIG. 6) has a single register in the control register portion 94. Therefore, if there are five registers there are five programmable control outputs, etc.. For example, a first chip select signal 64 corresponds to control register 300 and a last chip select signal 67 corresponds to control register 400.

Each of the plurality of registers 300 through 400 includes a CSEN (Chip Select ENable) bit which controls an operation of a corresponding one of the plurality of Chip Select signals 64 through 74. If the CSEN bit is a logic zero value for a given Chip Select signal, a corresponding integrated circuit terminal is disabled and an output is always negated. An attempt by data processor 10 to access an address mapped by the corresponding Chip Select signal will result in a transfer error and the Chip Select signal will not be asserted. When the CSEN bit is a logic one value, the corresponding integrated circuit terminal is enabled and provides an asserted Chip Select signal when an access address falls within a range corresponding to an external device and the Chip Select signal. The CSEN bit is cleared during a reset operation.

Additionally, each of the plurality of registers includes a PA (Pin Assert) bit. The PA bit is used to assert or negate an active-low output when the integrated circuit terminal corresponding to the Chip Select signal is operating as a programmable output pin. The PA bit is ignored if a PF bit is cleared or the CSEN bit is set. Each of the plurality of registers also includes a PF (Pin Function) bit. The PF bit is used to select a function of the corresponding integrated circuit terminal. For example, when the PF bit is a logic zero value, the integrated circuit terminal is used as a chip select output. When the PF bit is a logic one value, the integrated circuit terminal is used as a programmable output control integrated circuit terminal if the CSEN bit is cleared.

Each of the plurality of registers 300 through 400 also includes a WP (Write Protect) bit. The WP bit is used to restrict write operations to an address range defined by a corresponding Chip Select signal. When the WP bit is a logic zero value, write operations are allowed in the address range defined by the corresponding Chip Select signal. When the WP bit is a logic one value, write operations are prohibited. If data processor 12 attempts to write to an address mapped by the corresponding Chip Select signal, a transfer error is sent to the processor and the Chip Select signal remains negated.

The DSZ (Data Port Size) bits illustrated in FIG. 3 define a port data size value.

The EBC (Enable Byte Control) bits indicate which access types should assert a plurality of Enable Byte signals, referred to as Enable Bytes 204 through 210 in FIG. 2. When any one of the Enable Byte Control bits is a logic zero value, read and write accesses by data processor 12 are allowed to assert a corresponding one of the plurality of Enable Byte signals. Thus, when the EBC bits are a logic zero value, a corresponding Enable Byte signal is configured to operate as a byte enable. However, when any one of the Enable Byte Control bits is a logic one value, only write accesses by data processor 12 are allowed to assert a corresponding one of the plurality of Enable Byte signals. Therefore, when the EBC bits are a logic one value, the corresponding Enable Byte signal is configured to operate as a write enable. The EBC bits may be configured differently for each of the plurality of registers 95 and, therefore, for each of the plurality of Chip Select signals independently.

Each of the plurality of registers 95 also includes a DA (Device Attributes) value which is used to indicate device specific attributes and WSC (Wait State Control) value which programs a number of wait states for an access to an external device connected to a Chip Select signal. In this embodiment of the invention, an encoding of 111 indicates that an external Transfer Acknowledge (TA) input signal will be sampled to terminate a cycle. Note that a TA signal indicates when an external access has been terminated. All other encodings of the WSC bits enable an internally generated termination such as transfer retry acknowledge (TRA) or transmit error acknowledge (TEA). When an access is internally terminated, a state of the TA signal is ignored.

Each register in the registers 95 contains an AC (arbitration control) bit. These bits are the bits that are set to enable the embodiments illustrated in FIGS. 1–5. If the AC bit is set, the chip select 64–67 or output terminal that corresponds to the register is set so that bus arbitration is needed in order to use the pins/terminals 64–67. If the AC bit is cleared, then the terminal associated with the cleared AC bit is usable independent of bus ownership.

Note that alternate embodiments of the present invention may use more, fewer, or different register bit fields, and each register bit field may be used for control, status, or both control and status. In addition, alternate embodiment of the present invention may locate bit fields such as the AC bits in one or more separate registers. Also, different embodiments of the present invention may include any numbers of bits for each of the register bits fields illustrated in FIG. 3. Additionally, in some embodiments of the present invention, the control functionality of one or more of the register bit fields may be combined and encoded into fewer register bit fields.

While the present invention has been illustrated and described with reference to specific embodiments, further modifications and improvements will occur to those skilled in the art. For example, plurality as used herein may mean any number between two and infinity without limit to any particular sub-range or constant. Many different types of pins and terminals and many different types of pin/terminal configurations exist for packaged ICs and all are applicable herein. It is to be understood, therefore, that this invention is not limited to the particular forms illustrated and that it is intended in the appended claims to cover all modifications that do not depart from the spirit and scope of this invention.

What is claimed is:

1. A data processing system comprising:
   a first central processing unit having a bus request output, a bus grant input, at least one data bus output, at least one address bus output, at least one control bus output, and at least one programmable output;
   a second central processing unit having a bus request output, a bus grant input, at least one data bus output, at least one address bus output, at least one control bus output, and at least one programmable output;
   a bus control circuit coupled to both the first central processing unit and the second central processing unit, the bus control circuit determining which of the first central processing unit or the second central processing unit obtains ownership of the at least one data bus output, the at least one control bus output, and the at least one address bus output;
   at least one peripheral device coupled to the first central processing unit; and
   wherein the first central processing unit contains control circuitry which determines whether the at least one programmable output of the first central processing unit: (1) functions independent of a logic value provided on the bus grant input to the first central processing unit; or (2) functions only when the ownership of the at least one data bus output and the at least one address bus output is granted to the first central processing unit via an asserted signal provided through the bus grant input of the first central processing unit.

2. The data processing system of claim 1 wherein the second central processing unit contains control circuitry which determines whether the at least one programmable output of the second central processing unit: (1) functions independent of a logic value provided on the bus grant input to the first central processing unit; or (2) functions only when the ownership of the at least one data bus output and the at least one address bus output is granted to the first central processing unit via an asserted signal provided through the bus grant input of the first central processing unit.

3. The data processing system of claim 2 wherein the control circuitry of the second central processing unit is a programmable bit that is asserted or deasserted by the second central processing unit to determine a manner in which the at least one programmable output will operate as a whole.

4. The data processing system of claim 2 wherein the control circuitry of the second central processing unit is a plurality of programmable bits that are selectively asserted or deasserted by the second central processing unit to determine a manner in which the at least one programmable output will operate.

5. The data processing system of claim 2 wherein the control circuitry of the second central processing unit is a plurality of programmable bits that are selectively asserted or deasserted by the second central processing unit to determine a manner in which the at least one programmable output will operate, the plurality of programmable bits having one unique programmable bit for each programmable output in the at least one programmable output.

6. The data processing system of claim 1 wherein the first central processing unit includes control circuitry, the control circuitry being a programmable bit that is asserted or deasserted by the first central processing unit to determine a manner in which the at least one programmable output will be arbitrated.

7. The data processing system of claim 1 wherein first central processing unit includes control circuitry, the control circuitry of the first central processing unit being a plurality of programmable bits that are selectively asserted or deasserted by the first central processing unit to determine a manner in which the at least one programmable output will operate.

8. The data processing system of claim 1 wherein the control circuitry of the first central processing unit is a plurality of programmable bits that are selectively asserted or deasserted by the first central processing unit to determine a manner in which the at least one programmable output will operate, the plurality of programmable bits having one unique programmable bit for each programmable output in the at least one programmable output.

9. The data processing system of claim 1 wherein the at least one programmable output of the first central processing unit can be selectively programmed to function as either an output port or as chip select signals.

10. The data processing system of claim 1 wherein the at least one programmable output of the first central processing unit are used to control a step of either programming or erasing of floating gate memory coupled to the first processing unit.

11. A data processing system comprising:
    a first processor having a bus request output, a bus grant input, and a plurality of programmable outputs;
    a second processor having a bus request input coupled to the bus request output and a bus grant output coupled to the bus grant input;
    a plurality of subsystems;
    a bus coupling the plurality of subsystems to both the first and second processors; and
    wherein the plurality of programmable outputs are either: (1) programmed to be operable only when the bus is granted to the first processor and tri-stated when the bus is not granted to the first processor; or (2) programmed to be functional without regard to the status of the bus grant input.

12. The data processing system of claim 11 wherein the second processor has a plurality of programmable outputs which are: (1) programmed to be operable only when the bus is granted to the first processor and tri-stated when the bus is not granted to the first processor; or (2) programmed to be functional without regard to a status of the bus grant input.

13. The data processing system of claim 11 wherein the plurality of programmable outputs are coupled to a plurality of control bits internal to the first processor, the plurality of control bits being either asserted or deasserted by the first processor to indicate which of the plurality of programmable outputs are operating only when the bus is granted to the first processor and which of the plurality of programmable outputs are functional without regard to a status of the bus grant input.

14. The data processing system of claim 11 wherein the plurality of programmable outputs are coupled to one control bit internal to the first processor, the one control bit being either asserted or deasserted by the first processor to indicate either that the plurality of programmable outputs are to operate only when the bus is granted to the first processor or operate without regard to a status of the bus grant input.

15. The data processing system of claim 11 wherein the plurality of programmable outputs are coupled to glue logic external to the first processor when programmed to operate without regard to the status of the bus grant input.

16. The data processing system of claim 15 wherein the glue logic either (1) provides static control values when a control signal is tri-stated; or (2) prioritizes between two or more control signals that are asserted in a conflicting manner.

17. The data processing system of claim 11 wherein the plurality of programmable outputs of the first processor are coupled directly to other pins of the second processor without a need for glue logic when programmed to operate only when the bus is granted to the first processor.

18. An integrated circuit for use in a data processing system, the integrated circuit comprising:

a central processing unit (CPU);

a plurality of programmable external output terminals for transmitting logic values external to the integrated circuit;

a bus interface unit coupled to the CPU wherein the bus interface unit receives a bus grant signal external from the integrated circuit;

a control register accessible by the CPU wherein the control register contains at least one control bit, the at least one control bit: (1) preventing the plurality of programmable external output terminals from driving logic signals external to the CPU unless the bus grant signal is asserted to the bus interface unit when the at least one control bit is set to a first logic state by the CPU; and (2) allowing the plurality of programmable external output terminals to drive logic signals external to the CPU regardless of whether the bus grant signal is asserted to the bus interface unit when the at least one control bit is set to a second logic state by the CPU.

19. The integrated circuit of claim 18 wherein the at least one control bit is a plurality of control bits wherein each control bit in the plurality of control bits controls a unique one of the plurality of programmable external output terminals so that each terminal in the plurality of programmable external output terminals may be independently set to operate either in accordance with (1) or in accordance with (2).

20. The integrated circuit of claim 19 wherein each control bit in the plurality of control bits is part of a larger register of control values wherein the larger register of control values is provided for each programmable external output terminal.

21. The integrated circuit of claim 20 wherein each programmable external output terminal can be programmed to function as a either general purpose output terminal or as a chip select output.

22. An integrated circuit for use in a data processing system, the integrated circuit comprising:

a central processing unit (CPU);

a plurality of programmable external output terminals for transmitting logic values external to the integrated circuit;

a bus interface unit coupled to the CPU wherein the bus interface unit receives a bus grant signal external from the integrated circuit; and a plurality of control bits wherein each unique control bit corresponds to one unique programmable external output terminal in the plurality of programmable external output terminals, each control bit being programmable by the CPU and each control bit, when set to a first logic state, preventing its respective programmable external output terminal from driving logic signals external to the CPU unless the bus grant signal is asserted to the bus interface unit and each control bit, when set to a second logic state, allowing its respective programmable external output terminals to drive logic signals external to the CPU regardless of whether the bus grant signal is asserted to the bus interface unit.

23. An integrated circuit for use in a data processing system, the integrated circuit comprising:

a central processing unit (CPU);

an external bus coupled to the CPU for communicating information between the CPU and an environment external to the integrated circuit;

four or more external terminals of the integrated circuit which are accessible by the CPU; and four or more registers wherein one register corresponds to one of the four or more external terminals, each of the four or more registers containing an access control bit which determines: (1) whether the four or more external terminals are operational only when ownership of the external bus is granted to the integrated circuit; or (2) whether the four or more external terminals are driven independently of the ownership of the external bus, and each of the four or more registers containing a terminal function control bit which determines whether the four or more external terminals operate as chip selects or as general purpose output terminals for data.

24. A data processing system comprising:

a first central processing unit having a bus terminal for determining bus mastership, at least one data bus terminal, at least one address bus terminal, at least one control bus terminal, and at least one programmable terminal;

a second central processing unit having a bus terminal for determining bus mastership, at least one data bus terminal, at least one address bus terminal, at least one control bus terminal, and at least one programmable terminal;

a bus control circuit coupled to both the first central processing unit and the second central processing unit, the bus control circuit determining which of the first central processing unit or the second central processing unit obtains ownership of the at least one data bus terminal, the at least one control bus terminal, and the at least one address bus terminal via the bus terminals for determining bus mastership;

at least one peripheral device coupled to the first central processing unit; and wherein the first central processing unit contains control circuitry which determines whether the at least one programmable terminal of the first central processing unit: (1) functions independent of a logic value provided on the bus terminal of the first central processing unit; or (2) functions only when the bus terminal of the first central processing unit indicates ownership is granted to the first central processing unit via an asserted signal provided through the bus terminal of the first central processing unit.

* * * * *